US012729160B2

(12) United States Patent
Li et al.

(10) Patent No.: US 12,729,160 B2
(45) Date of Patent: Sep. 8, 2026

(54) PREPARATION DEVICE AND METHOD FOR ASPHALT CONCRETE CONTAINING MODIFIED ACID AGGREGATES

(71) Applicant: Xi'an University of Technology, Xi'an (CN)

(72) Inventors: Yanlong Li, Xi'an City (CN); Yunhe Liu, Xi'an City (CN); Yang Li, Xi'an City (CN); Heng Zhou, Xi'an City (CN); Wengang Li, Xi'an City (CN)

(73) Assignee: Xi'an University of Technology, Xian City (CN)

( * ) Notice: Subject to any disclaimer, the term of this patent is extended or adjusted under 35 U.S.C. 154(b) by 1037 days.

(21) Appl. No.: 17/939,162

(22) Filed: Sep. 7, 2022

(65) Prior Publication Data

US 2023/0227357 A1 Jul. 20, 2023

(30) Foreign Application Priority Data

Jan. 17, 2022 (CN) ........................ 202210048865.X

(51) Int. Cl.
*C04B 20/12* (2006.01)
*C04B 20/02* (2006.01)
(Continued)

(52) U.S. Cl.
CPC .......... *C04B 20/123* (2013.01); *C04B 20/023* (2013.01); *C04B 20/1051* (2013.01); *C04B 20/1055* (2013.01); *C04B 26/26* (2013.01)

(58) Field of Classification Search
CPC . C04B 20/123; C04B 20/023; C04B 20/1051; C04B 20/1055; C04B 26/26; C04B 20/12; C04B 20/1018; C04B 14/00
See application file for complete search history.

(56) References Cited

U.S. PATENT DOCUMENTS 2,139,027 A * 12/1938 Mcconnaughay ...... E01C 19/46 366/50
2,873,955 A * 2/1959 Sauer ................. E01C 19/1059 222/134
(Continued)

FOREIGN PATENT DOCUMENTS

CN 1448426 A * 10/2003
CN 1618886 A * 5/2005
(Continued)

*Primary Examiner* — Abigail A Risic
(74) *Attorney, Agent, or Firm* — Bradley Arant Boult Cummings LLP

(57) ABSTRACT

The preparation device includes an upper main conveyor belt, and an aggregate box, a first silane emulsion container and a first paper mill sludge container sequentially arranged above the upper main conveyor belt in a conveying direction. A lower auxiliary conveyor belt is arranged below the upper main conveyor belt, and a second paper mill sludge container and a second silane emulsion container are sequentially arranged between the upper main conveyor belt and the lower auxiliary conveyor belt in a conveying direction of the lower auxiliary conveyor belt. A trolley is arranged at the conveying tail end of the lower auxiliary conveyor belt, a gravity sensing device is arranged below the trolley, a mixer is arranged beside the trolley, and a heater is arranged at the bottom of the mixer.

9 Claims, 1 Drawing Sheet

(51) Int. Cl.
*C04B 20/10* (2006.01)
*C04B 26/26* (2006.01)

(56) References Cited

U.S. PATENT DOCUMENTS 3,614,071 A * 10/1971 Brock ................. E01C 19/1022 366/4
3,693,945 A * 9/1972 Brock ................... E01C 19/105 366/2
4,036,661 A * 7/1977 Schmidt ................... C08K 5/54 106/284.4
4,038,096 A * 7/1977 Graf ......................... C08K 5/54 106/284.4
4,170,484 A * 10/1979 Crawford .................. E01C 7/18 106/287.11

FOREIGN PATENT DOCUMENTS

CN 210589932 U * 5/2020
JP 5253454 B2 * 7/2013

* cited by examiner

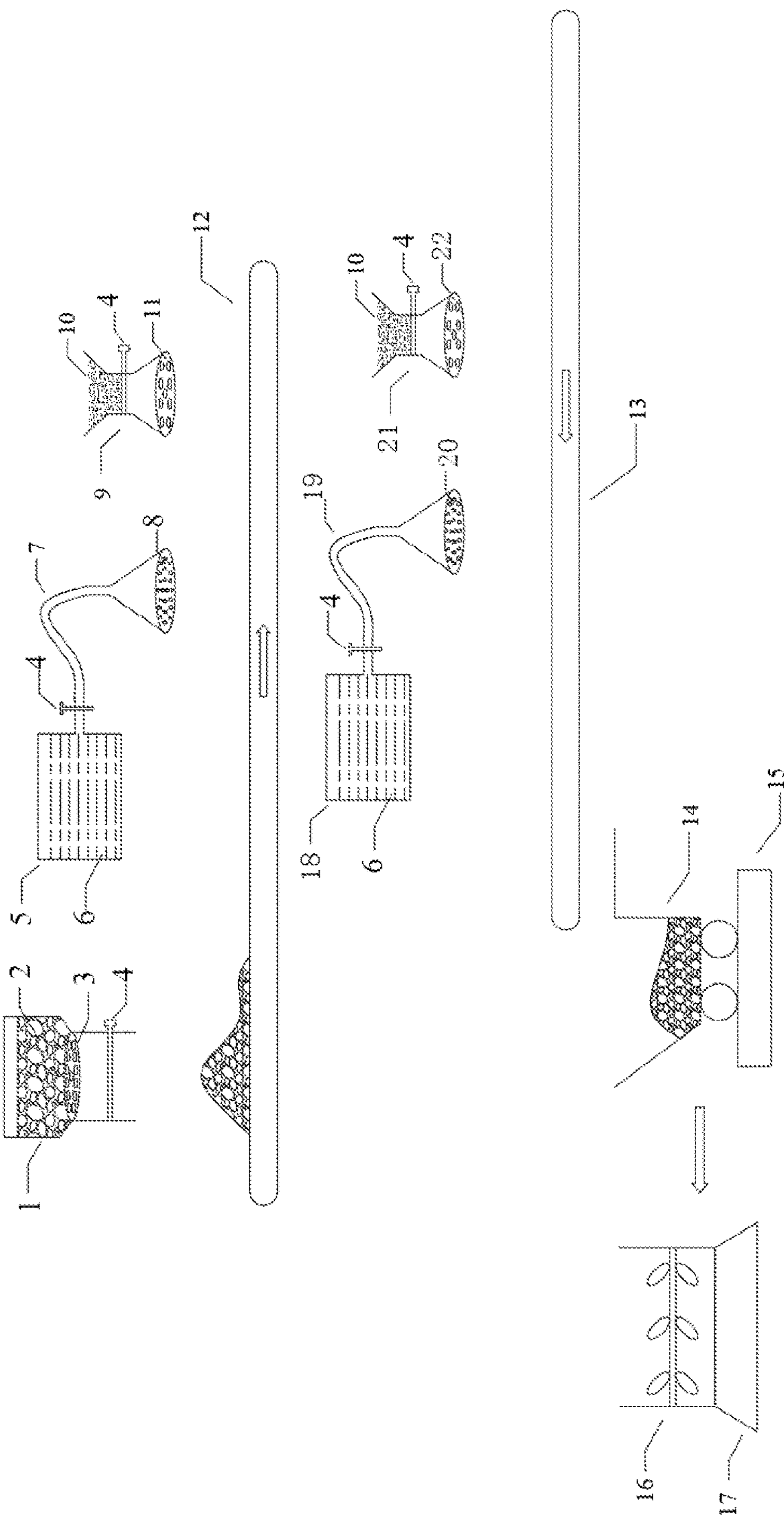
1
2
3
4
5
6
7
8
9
10
11
12
13
14
15
16
17
18
19
20
21
22

PREPARATION DEVICE AND METHOD FOR ASPHALT CONCRETE CONTAINING MODIFIED ACID AGGREGATES

CROSS REFERENCE TO RELATED APPLICATION

This patent application claims the benefit and priority of Chinese Patent Application No. 202210048865.X filed on Jan. 17, 2022, the disclosure of which is incorporated by reference herein in its entirety as part of the present application.

TECHNICAL FIELD

The present disclosure belongs to the technical field of impermeability of asphalt concrete, relates to a preparation device for asphalt concrete containing modified acid aggregates, and further relates to a preparation method for asphalt concrete containing modified acid aggregates.

BACKGROUND

The asphalt concrete has been widely used in water conservancy and hydropower engineering due to its characteristics of excellent impermeability, strong ability to adapt to foundation deformation, and ease of repair and engineering maintenance once defects appear. From the chemical point of view, in the hot mixing process, when the asphalt mixture is combined with the acid asphalt, the alkaline aggregates can chemically react with the asphalt to form water-insoluble compounds and generate chemical adsorption effect; while the acid aggregates do not chemically react with the acid asphalt, which makes the structure more stable and only generates intermolecular interaction which is physical adsorption, and the bonding performance of the intermolecular physical adsorption is weaker than that of the chemical adsorption force, thus the bonding force between the acid aggregates and the asphalt is poor. When the surface of hydraulic structure is in long-term contact with water, the water penetrates onto an interface between asphalt and aggregates and then exists in the form of water film or water vapor. As the water can wet the surfaces of the aggregates easier than the asphalt, and the asphalt is a hydrophobic substance, the asphalt on the surfaces of the aggregates can be replaced with the water and stripped from the surfaces of the aggregates, leading to serious damages to the structural stability which is called water damage. Therefore, the aggregates employed in the early asphalt concrete are alkaline aggregates. However, in the actual water conservancy and hydropower engineering, the aggregates for the hydraulic engineering asphalt concrete are selected according to the principles of from the near to the distant, from the superior to the inferior, adaption to local conditions, and making use of local materials; while in some dam site areas, within a reasonable economic transportation distance, it is not always possible to find suitable sources of alkaline rocks, and only neutral or acid aggregates such as granite and quartzite may be available. Alkaline aggregate sources are not distributed in every engineering site range or nearby; when there is no alkaline aggregate source near the engineering site or the transport distance is far, in consideration of the cost problem, only the local neutral or acid aggregate sources can be selected to replace alkaline aggregates for the asphalt concrete. Moreover, the distribution of carbonate rocks in the nature only accounts for 0.25% of the total rock, and alkaline aggregate resources are limited in many places in western China. The acid rocks have hard and dense texture and strong wear resistance but poor adhesion with the asphalt, which leads to limited application of the acid aggregates. In the prior art, the bonding strength between the asphalt and the acid aggregates cannot be well guaranteed by adding slaked lime or treating with saturated lime water, and an asphalt film is extremely easy to peel off under the action of water to rapidly cause water damage such as grain falling of asphalt, loosening and potholes.

SUMMARY

An objective of the present disclosure is to provide a preparation device for asphalt concrete containing modified acid aggregates to solve the problem of high cost of manufacturing asphalt concrete in areas lacking alkaline stones.

Another objective of the present disclosure is to provide a preparation method for asphalt concrete containing modified acid aggregates.

A preparation device for asphalt concrete containing modified acid aggregates is provided. The preparation device includes:

- an upper main conveyor belt;
- an aggregate box, a first silane emulsion container and a first paper mill sludge container sequentially arranged above the upper main conveyor belt in a conveying direction;
- a lower auxiliary conveyor belt arranged below the upper main conveyor belt;
- a second paper mill sludge container and a second silane emulsion container sequentially arranged between the upper main conveyor belt and the lower auxiliary conveyor belt in a conveying direction of the lower auxiliary conveyor belt;
- a trolley arranged at a conveying tail end of the lower auxiliary conveyor belt;
- a gravity sensing device arranged below the trolley;
- a mixer arranged beside the trolley; and
- a heater arranged at a bottom of the mixer.

Further, a screen mesh is arranged inside the aggregate box, and a valve is arranged at an outlet of the aggregate box.

Further, a first nozzle is connected to the first silane emulsion container via a first hose, a valve is arranged on the first hose.

Further, a first filter mesh is arranged at a bottom of the first paper mill sludge container, and a valve is arranged on the first paper mill sludge container and above the first filter mesh.

Further, a second filter mesh is arranged at a bottom of the second paper mill sludge container, and a valve is arranged on the second paper mill sludge container and above the second filter mesh.

Further, a second nozzle is connected to the second silane emulsion container via a second hose, and a valve is arranged on the second hose.

Further, a distance between the upper main conveyor belt and the lower auxiliary conveyor belt is 0.3 meters, and a distance from a conveying starting end of the lower auxiliary conveyor belt to a conveying termination end of the upper main conveyor belt is at least 2 meters.

A preparation method for asphalt concrete containing modified acid aggregates is provided, which employs the preparation device for asphalt concrete containing modified acid aggregates, and specifically comprises following processes:

pretreating acid aggregate step, for obtaining usage amounts of the acid aggregates with different particle sizes according to a ratio of the asphalt concrete, and screening the acid aggregates obtained, by an aggregate screening device;

preparing modified acid aggregate step, for putting the acid aggregates screened, into the aggregate box, putting silane emulsion into the first silane emulsion container, putting paper mill sludge ash into the first paper mill sludge container, and turning on the upper main conveyor belt and opening a valve on the aggregate box, a valve on the first silane emulsion container and a valve on the first paper mill sludge container in sequence, thus enabling the acid aggregates to be wetted by the silane emulsion and then to be wrapped with the paper mill sludge ash to obtain preliminarily modified acid aggregates; enabling the preliminarily modified acid aggregates to fall onto the lower auxiliary conveyor belt, and turning on the lower auxiliary conveyor belt and opening a valve on the second paper mill sludge container and a valve on the second silane emulsion container in sequence, thus enabling the preliminarily modified acid aggregates wrapped with the paper mill sludge ash, to be wetted by the silane emulsion and finally to fall into the trolley; and closing all valves and turning off the upper main conveyor belt and the lower auxiliary conveyor belt to obtain the modified acid aggregates when a weight measured by the gravity sensing device reaches requirements; and preparing asphalt concrete step, for adding asphalt with determined usage amount into the mixer and turning on the heater for heating to melt the asphalt, then adding the modified acid aggregates obtained in the preparing modified acid aggregate step into the mixer via the trolley, continuing to mix uniformly to obtain the asphalt concrete.

Further, in the preparing modified acid aggregate step, a conveying rate of the upper main conveyor belt is 1 m/s, a conveying rate of the lower auxiliary conveyor belt is increased from 1 m/s to 4 m/s at a constant speed, and then is decreased from 4 m/s to 1 m/s at a constant speed, and so on; and completion time for each rate increase and each rate decrease is 10 seconds.

Further, a heating temperature of the heater is 200 to 300° C., and a mixing rate of the mixer is 30 r/min.

The present disclosure has the beneficial effects.

(1) By wrapping the acid aggregates with the paper mill sludge ash, the adhesion between the acid aggregates and the asphalt is greatly strengthened, and the durability of the asphalt concrete is improved; and by adopting the acid aggregates, the usage amount of alkaline aggregate can be saved, thus the problem of the material source of the aggregates for the asphalt concrete is significantly solved.

(2) The paper mill sludge ash for wrapping in the present disclosure belongs to biosolid wastes, which contains a large amount of cellulose-based organic matters and plant nutrients such as nitrogen, phosphorus and potassium, as well as pathogens which are prone to rot and odor. The paper mill sludge, as the solid wastes, can result in environmental pollution and waste of resources after being directly discarded, and the alkalinity of the paper mill sludge can be processed to be used as an anti-stripping agent.

(3) The silane emulsion is used for wetting the paper mill sludge ash in the present disclosure. The silane is a milky white, odorless, non-toxic and non-corrosive liquid, when acting with the acid aggregates, the silane releases ethanol and then is combined with base materials to be converted into an organic silicon resin polymer, and a layer of hydrophobic film is ultimately formed on surfaces of pores of the acid aggregates, thus preventing water molecules and harmful ions from penetrating into the base materials, and achieving the purpose of waterproof protection. Moreover, the silane small molecules can rapidly penetrate onto the walls of the pores in the base materials. The chemical reaction speed is moderate, such that the penetration capacity and the penetration depth are excellent. The impermeability and the waterproofness of the asphalt concrete can be improved by wetting with the silane.

(4) The cost is greatly saved in selections of the anti-stripping agent, the wetting agent and the final aggregates, which brings huge economic benefits to huge engineering.

(5) The overall process of full-automatic mixing preparation of the asphalt concrete is achieved, the manpower is greatly reduced, the time is saved, and the preparation efficiency of modified asphalt concrete is guaranteed.

BRIEF DESCRIPTION OF THE DRAWINGS

FIGURE a schematic structural diagram of a preparation device for asphalt concrete containing modified acid aggregates according to the present disclosure.

Reference numerals: 1—aggregate box; 2—aggregate; 3—screen mesh; 4—valve; 5—first silane emulsion container; 6—silane emulsion; 7—first hose; 8—first nozzle; 9—first paper mill sludge container; 10—paper mill sludge ash; 11—first filter mesh; 12—upper main conveyor belt; 13—lower auxiliary conveyor belt; 14—trolley; 15—gravity sensing device; 16—mixer; 17—heater; 18—second silane emulsion container; 19—second hose; 20—second nozzle; 21—second paper mill sludge container; 22—second filter mesh.

DETAILED DESCRIPTION OF THE EMBODIMENTS

The following describes the present disclosure in detail with reference to the accompanying drawings and specific embodiments.

A preparation device for asphalt concrete containing modified acid aggregates is provided by the present disclosure. A structure of the preparation device is as shown in FIGURE. The preparation device includes an upper main conveyor belt 12, an aggregate box 1, a first silane emulsion container 5 and a first paper mill sludge container 9 sequentially provided above the upper main conveyor belt 12 in a conveying direction. A screen mesh 3 is arranged inside the aggregate box 1, and a valve 4 is arranged at an outlet of the aggregate box 1. A first nozzle 8 is connected to the first silane emulsion container 5 via a first hose 7, and a valve 4 is arranged on the first hose 7. A first filter mesh 11 is arranged at a bottom of the first paper mill sludge container 9, and a valve 4 is arranged on the first paper mill sludge container 9 and above the first filter mesh 11. The preparation device further includes a lower auxiliary conveyor belt 13 arranged below the upper main conveyor belt 12, a second paper mill sludge container 21 and a second silane emulsion container 18 sequentially arranged between the upper main conveyor belt 12 and the lower auxiliary conveyor belt 13 in a conveying direction of the lower auxiliary conveyor belt 13. A second filter mesh 22 is arranged at a bottom of the second paper mill sludge container 21, and a valve 4 is arranged on the second paper mill sludge container 21 and above the second filter mesh 22. A second nozzle 20 is connected to the second silane emulsion container 18 via a second hose 19, and a valve 4 is arranged on the second hose 19. The preparation device further includes a trolley 14 arranged at a conveying tail end of the lower auxiliary conveyor belt 13, a gravity sensing device 15 arranged below the trolley 14, a mixer 16 arranged beside the trolley 14, and a heater 17 arranged at the bottom of the mixer 16. A distance between the upper main conveyor belt 12 and the lower auxiliary conveyor belt 13 is 0.3 meters, and a distance from a conveying starting end of the lower auxiliary conveyor belt 13 to a conveying termination end of the upper main conveyor belt 12 is at least 2 meters. The bottom outlets of the first nozzle 8, the first paper mill sludge container 9, the second nozzle 20, the second silane emulsion container 18 each has a diameter of 1 meter.

A preparation method for asphalt concrete containing modified acid aggregates further is provided by the present disclosure, which adopts the preparation device for asphalt concrete containing modified acid aggregates, and includes the following specific steps.

Step 1, pretreating acid aggregates: usage amount of the acid aggregates with different particle sizes is obtained according to a ratio of the asphalt concrete, and the obtained acid aggregates with different particle sizes are screened by an aggregate screening device.

Step 2, the screened acid aggregates are put into the aggregate box 1, the first silane emulsion container 5 is filled with silane emulsion 6, paper mill sludge ash 10 is put into the first paper mill sludge container 9. The upper main conveyor belt 12 is turned on, the valve 4 on the aggregate box 1, the valve 4 on the first silane emulsion container 5 and the valve 4 on the first paper mill sludge container 9 are opened in sequence, thus enabling the acid aggregates to be wetted by the silane emulsion 6 and then to be wrapped with the paper mill sludge ash 10 to obtain preliminarily modified acid aggregates. The preliminarily modified acid aggregates fall onto the lower auxiliary conveyor belt 13, the lower auxiliary conveyor belt 13 is turned on, and the valve 4 on the second paper mill sludge container 21 and the valve 4 on the second silane emulsion container 18 are opened in sequence, thus enabling the preliminarily modified acid aggregates wrapped with the paper mill sludge ash 10, to be wetted by the silane emulsion 6 and finally to fall into the trolley 14. When the weight measured by a gravity sensing device 15 reaches the requirement, all valves 4 are closed, and the upper main conveyor belt 12 and the lower auxiliary conveyor belt 13 are turned off to obtain the modified acid aggregates.

A conveying rate of the upper main conveyor belt 12 is 1 m/s, a conveying rate of the lower auxiliary conveyor belt 13 is from 1 m/s to 4 m/s, and the discharge rates of the first silane emulsion container 5, the first paper mill sludge container 9, the second paper mill sludge container 21 and the second silane emulsion container 18 are 2-6 m/s; a flow rate of the silane emulsion 6 is 2-6 m/s, and a flow rate of the paper mill sludge ash 10 is 2-6 m/s.

Step 3, the asphalt with determined usage amount is added into the mixer 16, the heater 17 is turned on for heating to melt the asphalt, then the modified acid aggregates obtained in the step 2 is added into the mixer 16 via the trolley 14, and is further mixed uniformly to obtain the asphalt concrete.

The heating temperature of the heater 17 is 200 to 300° C., and the mixing rate of the mixer 16 is 30 r/min.

Comparative Example I

Crushed granite for an asphalt concrete core wall of a pumped storage power station in Xinjiang, is taken as acid aggregates, and Karamay 90 #A-grade asphalt is taken as asphalt. The acid aggregates are free of any treatment. A ratio of the asphalt concrete is as follows:

| Asphalt | Grading index | Asphalt-aggregate ratio | Usage amount of filler | Large stone | Middle stone | Small stone | Sand |
|---|---|---|---|---|---|---|---|
| Karamay 90# A-grade | 0.37 | 6.7% | 12% | 28% | 21% | 12% | 39% |

The asphalt concrete is prepared, and Marshall stability of the asphalt concrete is evaluated in accordance with the regulations of Test code for hydraulic asphalt concrete (DL/T5362-2009).

Comparative Example II

Crushed limestone for an asphalt concrete core wall of a pumped storage power station in Shanxi, is taken as alkaline aggregates, and Karamay 90 #A-grade asphalt is taken as asphalt. The alkaline aggregates are free of any treatment.

| Asphalt | Grading index | Asphalt-aggregate ratio | Usage amount of filler | Large stone | Middle stone | Small stone | Sand |
|---|---|---|---|---|---|---|---|
| Karamay 90# A-grade | 0.37 | 6.7% | 12% | 28% | 21% | 12% | 39% |

The asphalt concrete is prepared, and Marshall stability of the asphalt concrete is evaluated in accordance with the regulations of test code for hydraulic asphalt concrete (DL/T5362-2009).

Embodiment I

Crushed granite for an asphalt concrete core wall of a pumped storage power station in Xinjiang, is taken as acid aggregates, and Karamay 90 #A-grade asphalt is taken as asphalt.

Step 1, pretreating acid aggregates: usage amount of the acid aggregates with different particle sizes is obtained according to the ratio of the asphalt concrete, and the obtained acid aggregates with different particle sizes are screened by adopting the aggregate screening device.

Step 2, the screened acid aggregates are put into the aggregate box 1, the first silane emulsion container 5 is filled with the silane emulsion 6, the paper mill sludge ash 10 is put into the first paper mill sludge container 9. The upper main conveyor belt 12 is turned on, the valve 4 on the aggregate box 1, the valve 4 on the first silane emulsion container 5 and the valve 4 on the first paper mill sludge container 9 are opened in sequence, thus enabling the acid aggregates to be wetted by the silane emulsion 6 and then wrapped with the paper mill sludge ash 10 to obtain preliminarily modified acid aggregates. The preliminarily modified acid aggregates fall onto the lower auxiliary conveyor belt 13, the lower auxiliary conveyor belt 13 is turned on and the valve 4 on the second paper mill sludge container 21 and the valve 4 on the second silane emulsion container 18 are opened in sequence, thus enabling the preliminarily modified acid aggregates wrapped with the paper mill sludge ash 10, to be wetted by the silane emulsion 6 and finally fall into the trolley 14. When the weight measured by the gravity sensing device 15 reaches the requirements, all valves 4 are closed, and the upper main conveyor belt 12 and the lower auxiliary conveyor belt 13 are turned off to obtain the modified acid aggregates;

The conveying rate of the upper main conveyor belt 12 is 1 m/s, the conveying rate of the lower auxiliary conveyor belt 13 is increased from 1 m/s to 2 m/s at a constant speed, and then is decreased from 4 m/s to 3 m/s at a constant speed after reaching 4 m/s, and so on; and the completion time for each rate increase and each rate decrease is 10 seconds. The sprinkling rate of each of the first silane emulsion container, the first paper mill sludge container, the second paper mill sludge container and the second silane emulsion container is 2 m/s, a flow rate of the silane emulsion is 2 m/s, and a flow rate of the paper mill sludge ash is 2 m/s.

Step 3, the asphalt with determined usage amount is added into the mixer 16, the heater 17 is turned on for heating to melt the asphalt, then the modified acid aggregates obtained in the step 2 are added into the mixer 16 via the trolley 14, and is further mixed uniformly to obtain the asphalt concrete.

The heating temperature of the heater 17 is 250° C., and the mixing rate of the mixer 16 is 30 r/min.

The Marshall stability of asphalt concrete is evaluated in accordance with the regulations of Test code for hydraulic asphalt concrete (DL/T5362-2009).

Embodiment II

The difference from the embodiment I is that: the conveying rate of the lower auxiliary conveyor belt 13 is increased from 2 m/s to 3 m/s at a constant speed, and then is decreased from 3 m/s to 2 m/s at a constant speed after reaching 3 m/s, and so on; and the completion time for each rate increase and each rate decrease is 10 seconds. The sprinkling rate of each of the first silane emulsion container, the first paper mill sludge container, the second paper mill sludge container and the second silane emulsion container is 4 m/s, and the heating temperature of the heater 17 is 200° C.

The Marshall stability of asphalt concrete is evaluated in accordance with the regulations of Test code for hydraulic asphalt concrete (DL/T5362-2009).

Embodiment III

The difference from the embodiment 1 is that: the conveying rate of the lower auxiliary conveyor belt 13 is increased from 3 m/s to 4 m/s at a constant speed, and then is decreased from 4 m/s to 3 m/s at a constant speed after reaching 4 m/s, and so on; and the completion time for each rate increase and each rate decrease is 10 s. The sprinkling rate of each of the first silane emulsion container, the first paper mill sludge container, the second paper mill sludge container and the second silane emulsion container is 6 m/s, and the heating temperature of the heater 17 is 300° C.

The Marshall stability of asphalt concrete is evaluated in accordance with the regulations of Test code for hydraulic asphalt concrete (DL/T5362-2009).

The results of the Marshall stability test are shown in the following table:

| Project | Comparative Example 1 | Comparative Example 2 | Embodiment I | Embodiment II | Embodiment III |
|---|---|---|---|---|---|
| Marshall stability | 4.75 kN | 7.93 kN | 6.77 kN | 7.02 kN | 7.34 kN |

It can be known from the results of the stability coefficients that the Marshall stability of the asphalt concrete prepared from the modified acid aggregates is gradually increased, the results in the embodiment II and the embodiment III both exceed 7, which have reached the preparation standard of a common hydraulic asphalt concrete core wall, and are equivalent to those of the alkaline aggregate asphalt concrete in performance.

What is claimed is:

1. A preparation method for asphalt concrete containing modified acid aggregates, which employs the preparation device for asphalt concrete containing modified acid aggregates, wherein the preparation device comprising:

an upper main conveyor belt;

an aggregate box, a first silane emulsion container and a first paper mill sludge container sequentially arranged above the upper main conveyor belt in a conveying direction;

a lower auxiliary conveyor belt arranged below the upper main conveyor belt;

a second paper mill sludge container and a second silane emulsion container sequentially arranged between the upper main conveyor belt and the lower auxiliary conveyor belt in a conveying direction of the lower auxiliary conveyor belt;

a trolley arranged at a conveying tail end of the lower auxiliary conveyor belt;

a gravity sensing device arranged below the trolley;

a mixer arranged beside the trolley; and a heater arranged at a bottom of the mixer;

the preparation method specifically comprises following processes:

pretreating acid aggregate step, for obtaining usage amounts of the acid aggregates with different particle sizes according to a ratio of the asphalt concrete, and screening the acid aggregates obtained, by an aggregate screening device;

preparing modified acid aggregate step, for putting the acid aggregates screened, into the aggregate box, putting silane emulsion into the first silane emulsion container, putting paper mill sludge ash into the first paper mill sludge container, and turning on the upper main conveyor belt and opening a valve on the aggregate box, a valve on the first silane emulsion container and a valve on the first paper mill sludge container in sequence, thus enabling the acid aggregates to be wetted by the silane emulsion and then to be wrapped with the paper mill sludge ash to obtain preliminarily modified acid aggregates; enabling the preliminarily modified acid aggregates to fall onto the lower auxiliary conveyor belt, and turning on the lower auxiliary conveyor belt and opening a valve on the second paper mill sludge container and a valve on the second silane emulsion container in sequence, thus enabling the preliminarily modified acid aggregates wrapped with the paper mill sludge ash, to be wetted by the silane emulsion and finally to fall into the trolley; and closing all valves and turning off the upper main conveyor belt and the lower auxiliary conveyor belt to obtain the modified acid aggregates when a weight measured by the gravity sensing device reaches requirements; and preparing asphalt concrete step, for adding asphalt with determined usage amount into the mixer and turning on the heater for heating to melt the asphalt, then adding the modified acid aggregates obtained in the preparing modified acid aggregate step into the mixer via the trolley, continuing to mix uniformly to obtain the asphalt concrete.

2. The preparation method according to claim 1, wherein in the preparing modified acid aggregate step, a conveying rate of the upper main conveyor belt is 1 m/s, a conveying rate of the lower auxiliary conveyor belt is increased from 1 m/s to 4 m/s at a constant speed, and then is decreased from 4 m/s to 1 m/s at a constant speed, and so on; and completion time for each rate increase and each rate decrease is 10 seconds.

3. The preparation method according to claim 1, wherein in the preparing asphalt concrete step, a heating temperature of the heater is 0 to 300° C., and a mixing rate of the mixer is 30 r/min.

4. The preparation method according to claim 1, wherein a screen mesh is arranged inside the aggregate box, and a valve is arranged at an outlet of the aggregate box.

5. The preparation method according to claim 1, wherein a first nozzle is connected to the first silane emulsion container via a first hose, a valve is arranged on the first hose.

6. The preparation method according to claim 1, wherein a first filter mesh is arranged at a bottom of the first paper mill sludge container, and a valve is arranged on the first paper mill sludge container and above the first filter mesh.

7. The preparation method according to claim 1, wherein a second filter mesh is arranged at a bottom of the second paper mill sludge container, and a valve is arranged on the second paper mill sludge container and above the second filter mesh.

8. The preparation method according to claim 1, wherein a second nozzle is connected to the second silane emulsion container via a second hose, and a valve is arranged on the second hose.

9. The preparation method according to claim 1, wherein a distance between the upper main conveyor belt and the lower auxiliary conveyor belt is 0.3 meters, and a distance from a conveying starting end of the lower auxiliary conveyor belt to a conveying termination end of the upper main conveyor belt is at least 2 meters.

* * * * *